Figure 1:
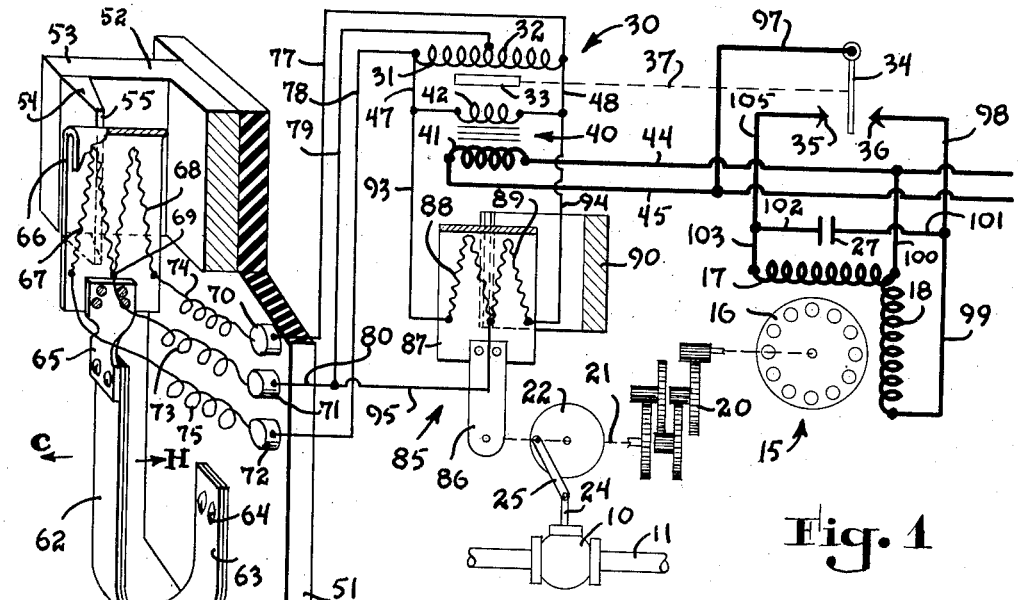

Dec. 31, 1940.  N. O. CLARK  2,226,845
CONDITION CONTROL SYSTEM
Filed Sept. 29, 1937

INVENTOR
Nelson O. Clark
BY
George H Fisher
ATTORNEY

Patented Dec. 31, 1940

2,226,845

UNITED STATES PATENT OFFICE 2,226,845

CONDITION CONTROL SYSTEM

Nelson O. Clark, Winthrop, Mass., assignor to Minneapolis-Honeywell Regulator Company, Minneapolis, Minn., a corporation of Delaware Application September 29, 1937, Serial No. 166,375

4 Claims. (Cl. 236—78)

The present invention relates to a condition control system and more particularly to one in which a condition controlling member is positioned in accordance with the value of a condition responsive variable resistance device.

It has been proposed, particularly in the condition controlling art, to remotely control the position of a member through a motor control system employing as its controlling means a variable resistance device. Such systems are often employed where it is desired to variably position a control member, such as a condition regulating member, in accordance with the value of a controlling condition so that the condition controlling member may assume any one of a multiplicity of positions depending upon the value of the controlling condition. Such systems have in the past been open to several serious objections, all arising from the type of variable resistor which has been found necessary to employ. The type of resistor which has been previously used in these systems is a conventional type of variable resistance wherein a contact slides over a fixed resistor to determine the resistance value of the variable resistance device. The difficulty with the use of such a variable resistance device in a system of the class under consideration is that there is always danger, unless the contact pressure is unduly increased, of contact failure. As soon as this occurs, control of the system is lost. On the other hand, if the contact pressure is increased to the point where the danger of contact failure is minimized, the movement of the contact member requires too much power for a sensitive condition responsive member.

In addition to the above objections, it has usually been found necessary to employ a wound wire resistance, which definitely decreases the number of positions possible.

An object of the present invention is to provide a control system for a member to be positioned in which the control is exercised through a variable resistance device consisting of a resistance element of a material which when subjected to a magnetic field has its resistance varied in accordance with the intensity of the field and means for subjecting said element to a magnetic field and varying the effect of said field on said element in accordance with the desired movement of said member.

A further object of the present invention is to provide such a system in which two such variable resistance devices are employed, one as a control resistance and the other as a follow-up mechanism to terminate the movement of the member.

A further object of the invention is to provide such a system in which the control variable resistance is adjusted by a condition responsive element.

Figure 2:
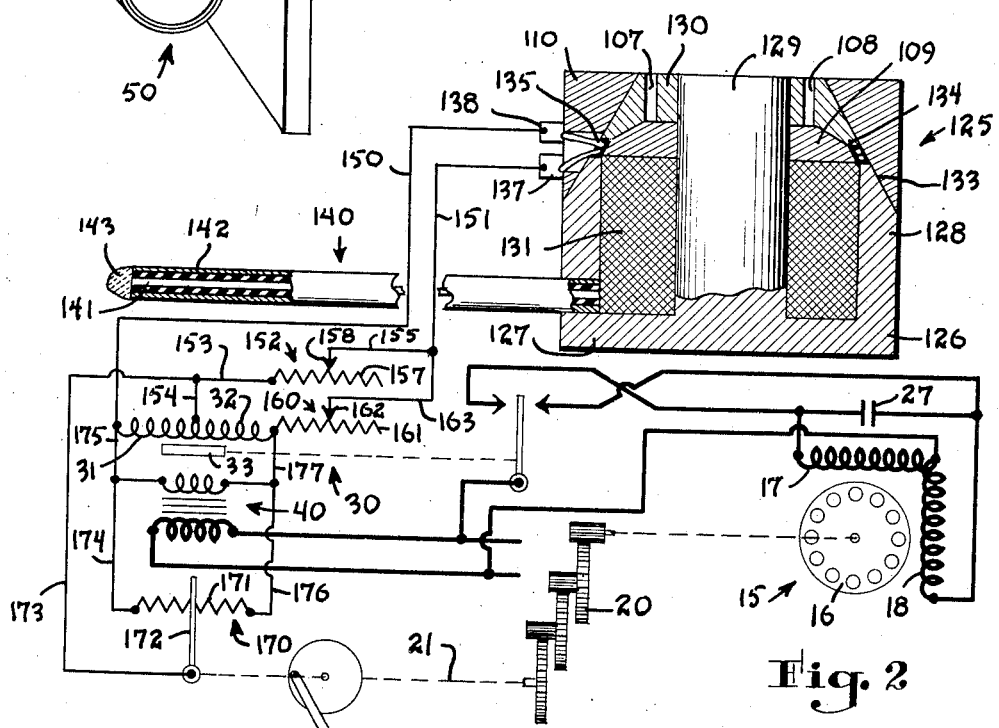

Further objects of the present invention will be apparent from a consideration of the accompanying specification, claims and drawing, of which Figure 1 is a schematic view of one species of the invention, and Figure 2 is a schematic view of a second form of the invention.

Referring to Figure 1, the system is shown as employed for the control of a valve 10, which valve may be used for the control of steam through a steam line 11 leading to a radiator or other similar heating device. The valve 10 is operated by a motor 15 which consists of a rotor 16 and a pair of field windings 17 and 18. The rotor 16 is connected through a reduction gear train 20 with a shaft 21. Upon the shaft 21 is secured a crank disc 22. Extending between the crank disc 22 and the stem 24 of the valve 10 is a link 25. It will be obvious that rotation of crank disc 22 causes either opening or closing of the valve, depending upon the direction of rotation of crank disc 22.

The motor 15 is of the condenser type and has associated therewith a condenser 27. The condenser 27 is adapted to be connected in series with either field winding 17 or field winding 18, depending upon the desired direction of rotation. If the condenser 27 is connected in series with one of the field windings, the motor rotates in one direction and if connected in series with the other field winding rotates in the opposite direction.

A relay 30 is employed to control the energization of the motor connections between the condenser and the field windings. The relay consists of a pair of relay coils 31 and 32 which are connected together at one end. Associated with the relay coils 31 and 32 is an armature member 33 which is connected to a switch blade 34 through a suitable connecting member 37. The switch blade 34 is adapted to engage with either of two contacts 35 or 36. When both coils are equally energized, the switch blade is in the position shown wherein it is in engagement with neither contact 35 nor contact 36. When the relay coil 32 becomes more highly energized than relay coil 31, armature 33 is drawn to the right moving switch blade 34 into engagement with contact 36. When relay coil 31 becomes more highly energized than relay coil 32, armature 33 is drawn to the left moving switch blade 34 into engagement with contact 35.

A step-down transformer 40 is employed for supplying low voltage power for operation of this system. This transformer comprises a line voltage primary 41 and a low voltage secondary 42. The line voltage primary 41 is connected to line wires 44 and 45 leading to any suitable source of power (not shown). The low voltage secondary 42 is connected through conductors 47 and 48 to the opposite terminals of relay coils 31 and 32. It will, accordingly, be seen that relay coils 31 and 32 are connected in series across the source of power.

A variable resistance device, generally indicated by the reference numeral 50, is used as a voltage divider to control the relative energizations of relay coils 31 and 32. This device, in itself, forms the basis of my co-pending application, Serial No. 166,373, filed on even date herewith. This device is described in more detail in this application, and for a clearer understanding of the same, reference is made to that application. The device consists of an insulated base 51 upon which is mounted a permanent magnet 52. Only half of magnet 52 has been shown. It is to be understood that magnet 52 is in the form of a horseshoe magnet and has two leg portions 53, only one of which is shown. Secured to each of these leg portions is a pole piece 54 of a material of high magnetic permeability. The pole pieces 54 are tapered so as to provide a relatively narrow edge 55. The magnet is so designed that edges 55 are spaced apart by a relatively narrow gap, as is more clearly indicated in the above referred to application.

Also secured to the base 51 is a bimetallic element 62 which is bent at its lower end to form a U-shaped portion. The doubled-back portion 63 is secured to the base by a fastening means 64. The upper end of bimetallic element 62 has secured thereto a strip member 65 which is twisted through an angle of 90° and has secured to the upper end thereof a doubled-over strip of copper 66. The strip 66 serves to support two non-inductively wound resistance members 67 and 68. These members are formed of a material which when placed in a magnetic field has its resistance changed in accordance with the intensity of that field. A material which exhibits this property to a marked degree is bismuth although nickel and some other materials exhibit this property to a somewhat lesser degree. The two resistance coils 67 and 68 are joined together at 69.

Located on the base 51 are three terminals 70, 71, and 72. Wires 73, 74, and 75 serve to connect the junction 69 and the outer terminals of relay coils 68 and 67, respectively, to the terminals 71, 70, and 72, respectively.

The two terminals 70 and 72 leading to the outer terminals of resistance coils 68 and 67, respectively, are connected through conductors 77 and 78 with the outer terminals of relay coils 32 and 31, respectively. The junction of the relay coils 31 and 32 is connected through conductors 79 and 80 with the terminal 71 which leads to the junction 69 of coils 68 and 67. It will, accordingly, be noted that the resistances 67 and 68 are connected in parallel with relay coils 31 and 32 and act to control the voltage impressed across these coils.

Referring to the operation of resistance device 50, the bimetallic element 62 is operative when subjected to temperature changes to cause movement of the resistance supporting member 66 in a direction transverse to the plane passing through the edges 55 of the pole pieces 54. In the position shown in the drawing, the resistance coils 67 and 68 are equally spaced on the two sides of the plane passing through these edges 55. Upon any deflection of bimetallic element 62, one of the elements is moved into said plane and the other element is moved away from such plane. The result of this is that one of the elements is subjected to a stronger magnetic field and the other is subjected to a lesser magnetic field. It will, accordingly, be obvious that the movement of bimetallic element 62 as the result of a temperature change causes the resistance of one element to increase with respect to that of the other. The direction of the temperature change depends upon which of the two elements has its resistance increased and which has its resistance decreased.

The copper element 66 besides acting as a support for the resistance elements serves to conduct heat away from the same. In view of the fact that bismuth has a very low melting point, it is necessary if very large currents are to be employed to use such an element of copper or other material of high heat conductivity. It is to be understood that wires 67 and 68 are suitably insulated from the member 66. As previously indicated, elements 67 and 68 are non-inductively wound. This is particularly important where the apparatus is to be used with alternating current. If the apparatus is used with direct current, particularly of small magnitude, the resistances 67 and 68 may safely be inductively wound.

Referring again to the cooperation between the variable resistance device and relay 30, it will be obvious that the relative resistance values of the resistances 67 and 68 produced by a change in temperature will cause variations in the relative energizations of relay coils 31 and 32. Thus, if the temperature changes in a direction such as to cause movement to the right of the resistor support 66, resistance 67 is moved into the plane of greatest magnetic intensity and resistance 68 is moved out of such plane. The result is that the resistance value of resistance 67 is increased and that of resistance 68 is decreased. This causes relay coil 31 to be more highly energized than relay coil 32 to cause movement of armature 33 to the left. Likewise, if the temperature changes in the opposite direction the resistance value of resistance element 68 is increased and that of element 67 is decreased so as to increase the energization of relay coil 32 and decrease that of relay coil 31. While the bimetallic element may be designed so as to secure deflection in either direction upon a given temperature change, in the present case it is designed to move to the left upon a temperature drop and to the right upon a temperature rise, as indicated by the legends C and H on the drawing.

A second variable resistance device 85 is also employed to control the energization of relay coil 30. This device is substantially identical in construction to the variable resistance device 50 with the exception that the member carrying the resistor support is an arm 86 which is secured to the shaft 21 so as to be moved whenever there is movement of the valve. Arm 86 carries at its upper end a doubled-over sheet of copper 87 which supports a pair of resistance coils 88 and 89 corresponding in all respects to resistance coils 67 and 68. Cooperating with the resistance elements 88 and 89 is a permanent magnet 90 which is similar in all respects both as to construction and as to its relation to the resistance coils 88 and 89, to the magnet 52 previously described. The outer ends of the resistance elements 88 and 89 are connected through conductors 93 and 47 on the one hand and 94 and 48 on the other hand to the opposite terminals of relay coils 31 and 32. The junction of resistance elements 88 and 89 is connected through conductors 95 and 79 with the junction of relay coils 31 and 32. It will be apparent that the resistance elements 88 and 89, like resistance elements 67 and 68, are connected in parallel with relay coils 31 and 32 and control the relative voltage impressed across these coils, and in consequence determine the relative energizations thereof. Thus when arm 86 is moved to the right so as to bring resistance element 88 into the plane passing through the poles of the magnet and resistance element 89 away from such plane, the resistance of element 88 is increased and that of element 89 decreased so as to increase the energization of relay coil 31 and decrease that of relay coil 32. When an opposite movement of arm 86 takes place, an opposite result occurs so far as the energization of relay coils 31 and 32 is concerned. The variable resistance device 85 is employed to terminate the movement of the motor 15 after a desired amount of such movement has taken place, as will be more apparent from the subsequent description. By so arranging the apparatus that when member 86 is moved in a direction opposite to the direction of movement of bimetallic element 62 which initiated operation of the motor, it is possible to rebalance the energization of relay coils 31 and 32 after a predetermined movement of the motor to move the relay to its neutral position and deenergize the motor.

*Operation of Figure 1 species*

The various elements are shown in the drawing in the position which they assume when the temperature is at substantially the desired value. Let it be assumed now that the temperature adjacent bimetallic element 62 begins to decrease. This will cause movement to the left of resistor support 66 bringing resistance 68 into the plane extending through the edges 55 of pole piece 54, and at the same time moving resistance 67 farther away from such plane. This results, as previously described, in an increase in the resistance of element 68 and a decrease in the resistance of element 67. The effect of this, as previously explained, is to cause the energization of relay coil 32 to increase with respect to that of relay coil 31 moving armature 33 to the right and causing engagement of switch blade 34 with contact 36. When this takes place, the following circuit is established to field winding 18: from line wire 45 through conductor 97, switch blade 34, contact 36, conductors 98 and 99, field winding 18, and conductor 100 to the other line wire 44. At the same time, a circuit is established to field winding 17 as follows: from line wire 45, through conductor 97, switch blade 34, contact 36, conductors 98 and 101, condenser 27, conductors 102 and 103, field winding 17, and conductor 100 to the other line wire 44. The result of the establishment of these two circuits is that field winding 18 is directly connected across the line wires whereas field winding 17 is connected in series with the condenser 27. This causes the current through field winding 17 to lead that through field winding 18 so as to produce a rotating magnetic field which causes rotation of the motor 15 in a predetermined direction. Rotation of motor 15 is effective to cause a clockwise rotation of shaft 21. The clockwise rotation of shaft 21, in turn, imparts a clockwise rotation to crank disc 22 which causes the valve 10 to be moved towards open position. In this manner, more steam is admitted through valve 10 to the radiator or other steam utilizing device.

At the same time that the valve is moved to open position as a result of the clockwise rotation of shaft 21, member 86 is also moved in a clockwise direction, or in the position indicated in the drawing, is moved to the right. This causes resistance element 88 to be moved into the plane passing through the magnets and resistance element 89 away from such plane. The result of this is that the resistance of element 88 is increased and that of element 89 decreased so that the energization of relay coil 31 is increased and that of relay coil 32 decreased. This produces an opposite effect upon the relative energizations of relay coils 31 and 32 to that produced by the deflection to the left of bimetallic element 62. Accordingly, after movement of arm 86 has proceeded an amount corresponding to the movement of bimetallic element 62, relay coils 31 and 32 will again be equally energized so that switch blade 34 moves to the position shown in the drawing wherein the motor 15 is denergized.

The normal result of moving valve 10 towards open position is that after a certain amount of time has elapsed, the temperature adjacent bimetallic element 62 will again rise. The effect of this is to cause the resistances 67 and 68 to be moved back towards the right causing resistance 67 to be moved in or more nearly into the plane passing through the pole pieces and resistance 68 out of such plane. The effect of this is to increase the resistance of element 67 and decrease that of element 68, which in turn causes the energization of relay coil 31 to be increased and that of relay coil 32 to be decreased. This, in turn, causes switch blade 34 to be moved into engagement with contact 35, which results in the following circuit being established to field winding 17: from line wire 45 through conductor 97, switch blade 34, contact 35, conductors 105 and 103, field winding 17, and conductor 100 to the other line wire 44. At the same time, a circuit is established to the other field winding 18 as follows: from line wire 45, through conductor 97, switch blade 34, contact 35, conductors 105 and 102, condenser 27, conductors 101 and 99, field winding 18, and conductor 100 to the other line wire 44. It will be noted that in the new position of switch blade 34, the condenser 27 is connected in series with field winding 18 whereas field winding 17 is now the one directly connected across the line. The result is that the current through field winding 18 leads that through field winding 17 so as to cause a rotating field in the opposite direction to that previously caused. The result is that the motor 15 is now effective to rotate shaft 21 in a counter-clockwise direction. The counter-clockwise movement of shaft 21 causes a counter-clockwise movement of crank disc 22 which, in turn, causes valve 10 to be moved towards closed position.

This again decreases the flow of steam through pipe 11.

At the same time that valve 10 is being moved to closed position as the result of the counterclockwise movement of shaft 21, the arm 86 is moved to the left to move resistance element 89 in or more nearly into the plane passing through the pole pieces of magnet 90 and resistance element 88 out of or farther away from such plane. The result is that the resistance of element 88 is decreased and that of element 89 increased to in turn decrease the energization of relay coil 31 and increase that of relay coil 32. This effect is opposite to the effect caused by the movement to the right of bimetallic element 62 so that after a predetermined movement of the valve towards closed position the relay 30 is rebalanced causing switch blade 34 to again assume the position shown in the drawing, in which position the motor is deenergized.

It will be noted that by reason of the particular type of variable resistance devices 50 and 85 employed there are no sliding contacts whatsoever. Moreover, the number of positions is limited only by the necessary differential existing between contacts 35 and 36 of the relay. It will, accordingly, be seen by the provision of the variable resistance devices 50 and 85 the sensitivity and reliability of the system constitutes a very marked improvement over prior systems wherein reliance was placed upon sliding contacts.

Description of Figure 2 species

Figure 2 shows a modified form of a control system. In this figure a variable resistance device employing a resistance element of a material, which when placed in a magnetic field has its resistance varied in accordance with the intensity of that field, is employed as the controlling resistance for the system. In this case, however, the variation in resistance is accomplished by variations in the magnetic field as a whole rather than by any shifting of the resistance element relative to the magnetic field. Moreover, in this case the follow-up resistance is of the usual sliding contact type, inasmuch as it is possible in view of the fact that the contact is operated by the motor to have a relatively firm contact pressure. In view of the fact that the operation of the motor and the valve is substantially the same as in the previously described species, the description of the operation of the motor produced by a change in energization of the relay will not be repeated here. Moreover, in order to more clearly indicate the similar elements of the system, those elements which are identical to the elements of Figure 1 have been given similar reference characters.

It will be noted that again the controlling device is a valve 10 controlling the flow of fluid through a pipe 11. In the present instance, however, the pipe 11 may conduct fuel to a burner in lieu of steam to a radiator. The burner may be one which is capable of producing relatively high temperatures inasmuch as the variable resistance control device of the present species is one which is particularly adapted to respond to high temperatures. As in the preceding species, the valve 10 is driven by a motor 15 through a reduction gear train 20. Moreover, as in the preceding species, the motor consists of a rotor 16, field windings 17 and 18, and a condenser 27 which is alternately connected to field windings 17 and 18 through the relay 30 which is identical in construction to the relay of the previous species bearing the same reference character. The relay, as in the previous species, consists of relay coils 31 and 32 which are joined together at one end.

The energization of relay coil 31 and consequently the relative energizations of relay coils 31 and 32 are controlled by a variable resistance device indicated generally by the reference numeral 125. This variable resistance unit forms a basis of my co-pending application Serial No. 166,374, filed of even date herewith. For a more complete understanding of this variable resistance device, reference is made to this application in which the same is described in greater detail. It will be noted that the variable resistance device 125 comprises a core member 126 having a circular base portion 127, a cylindrical wall 128, and a central solid cylindrical portion 129. Surrounding the central portion 129 is an electromagnetic coil 131. Secured to the upper portion of the central portion 129 is a member 130 which is inverted cup-shaped in form. Members 129 and 130 are secured intimately together so that the joint between them offers very little magnetic reluctance. The upper edge of the cylindrical portion 128 of core member 126 is tapered as at 133. Similarly, the lower edge of member 130 is likewise tapered as at 134. The effect of the adjacent edges of members 130 and 127 being tapered is that a magnetic field of very high density is produced at this point.

These edges 133 and 134 are separated by an annular gap, and in this gap a resistance coil 135 is located. The resistance coil 135 is formed of insulated wire of the same material as the resistance elements 67, 68, 88, and 89 of the previous species or, in other words, of a material which when placed in a magnetic field has its resistance changed in accordance with the intensity of the field, such as bismuth. In view of the fact that the resistance element 135 is located between the tapered portions 133 and 134 of members 127 and 130, it is subjected to a field of very high magnetic density so as to be very responsive to any change in the intensity of said field. The resistance element 135, particularly when the apparatus is to be used with alternating current or direct current of relatively large magnitude, should be non-inductively wound. This can be accomplished by looping a single conductor back upon itself so that the inductive effect in the respective turns is completely neutralized. The ends of resistance element 135 are connected to terminals 137 and 138.

In order to minimize the leakage around the resistance element 135 as much as possible the regions on both sides of this element are filled with a material of very low magnetic susceptibility. In view of the low melting point of bismuth, this material should also have a very low melting point and at the same time should have a relatively high heat conductivity in order to carry the heat away from the bismuth. Material which is particularly suitable for this purpose is ordinary solder, an alloy of approximately 50 per cent lead and 50 per cent tin. Openings 107 and 108 are provided through the member 130, one of which openings permits the introduction of solder and the other of which permits the escape of the air. The solder introduced through these openings fills up the space between members 130 and the electromagnetic coil 131 to form the member indicated by the reference numeral 109. An annular member of triangular cross section, also of solder, is formed around the outer edge of element 135, this member being indicated in the drawing by the reference numeral 110. Members 109 and 110 serve to reduce to a minimum the leakage around the resistance element 135 and at the same time serve to conduct the heat away from this element and to prevent the same from being raised to a temperature at or above the melting point of bismuth.

The thermo-couple 140 is employed for energizing and varying the energization of the electromagnetic coil 131. Thermo-couple 140 consists of the usual inner and outer elements 141 and 142 suitably insulated from each other. Elements 141 and 142 may consist of any suitable metals of proper thermo-electric characteristics which are at the same time capable of withstanding the relatively high temperatures. It has been found desirable to use an inner element of constantan, an alloy consisting of about 50% nickel and 50% copper and an outer element of stainless steel. This stainless steel may be any one of the numerous commercial varieties of stainless steel. The elements 141 and 142 are joined together at 143 to provide a hot junction. The elements 141 and 142, at their opposite ends, are connected to the opposite ends of the winding 131. If the distance between the hot junction and the electromagnetic coil is excessively long, it is desirable to interrupt the elements 141 and 142 and connect thereto copper elements of similar shape, which have a very much lower resistance than the elements of constantan and stainless steel. It will be readily apparent that the energization of electromagnetic coil 131 and consequently the density of the flux to which resistance element 135 is subjected is determined by the temperature at the hot junction 143. If hot junction 143 is placed in a region of relatively high temperatures, the resistance of element 135 will change as this temperature changes.

The terminal 138 of the resistance device 125 is connected through a conductor 150 with the outer terminal of relay coil 31. The other terminal 137 of the resistance 135 is connected through conductors 151 and 155, a rheostat 152 and conductors 153 and 154 with the other terminal of relay coil 31. Rheostat 152 consists of a fixed resistance 157 and contact 158 in sliding engagement with resistance 157. It will be readily apparent that, for any position of contact 158, the voltage impressed across relay coil 31 and consequently the energization thereof is determined by the value of resistance 135. The energization of relay coil 32 is controlled by a rheostat 160. This rheostat consists of a fixed resistance 161 and a contact 162 in sliding engagement with resistance 161. One terminal of resistance 161 is connected to the outer end of relay coil 32. The sliding contact 162 is connected through conductors 163 and 155, contact 158, resistance 157, and conductors 153 and 154 to the inner terminal of relay coil 32. It will be noted that rheostat 160 is connected, in series with rheostat 152, across relay coil 32, so that for any fixed setting of rheostat 152 the voltage impressed across relay coil 32 is determined by the setting of rheostat 160.

The rheostat 160 is used for controlling the temperature setting of the apparatus. Inasmuch as this rheostat controls the energization of the coil 32, which opposes the action of coil 31, it will be obvious that a change in the position of rheostat 160 changes the value of resistance 135 at which the relay will be balanced. Consequently, by suitable adjustment of rheostat 160, the apparatus can be adjusted so that the relay is balanced for any desired temperature.

The rheostat 152 is employed for the adjustment of the sensitivity of the apparatus. The resistance value of rheostat 152 determines the effect both of variable resistance 135 and of rheostat 160. The greater the resistance value of rheostat 152, the more is the change in the value of resistance 135 that is necessary to produce a given effect upon the relative energizations of relay coils 31 and 32.

It will be readily seen that with the adjustments of rheostats 152 and 160 fixed, an increase of temperature to which thermo-couple 140 is subjected causes an increase in the resistance value of resistance 135 and consequently an increase in the energization of relay coil 31. This results in relay coil 31 being more highly energized than relay coil 32, causing the armature 33 to be drawn to the right to cause movement of the motor in one direction in the same manner as in the preceding species. Similarly, when the temperature to which the thermo-couple 140 is subjected is decreased, the energization of relay coil 31 is decreased so that armature 33 is drawn to the left to cause rotation of the motor in the opposite direction.

Also controlling the relative energizations of relay coils 31 and 32 is a potentiometer 170. This potentiometer consists of a fixed resistance 171 and a contact arm 172 slidable thereover. The contact arm 172 is connected to shaft 21 driven by the motor 15 so as to be moved therewith. The contact arm 172 is connected through conductors 173 and 154 to the junction of relay coils 31 and 32. The outer terminals of resistance 171 are connected through conductors 174 and 175 on the one hand and conductors 176 and 177 on the other hand with the outer terminals of relay coils 31 and 32. The potentiometer 170 is thus connected in parallel with relay coils 31 and 32 so as to control the relative energizations of these coils. When the contact arm 172 is moved to the right, the effect is to decrease the voltage across relay coil 32 and increase the same across relay coil 31 so as to increase the energization of relay coil 32 and decrease that of relay coil 31. Upon an opposite movement of contact arm 172, an opposite effect is produced in the relative energization of relay coils 31 and 32. The potentiometer 170 is used to produce the same adjustment as the variable resistance device 85 in the previous species, that is, to rebalance the energization of relay coils 31 and 32 after the required movement of the valve has taken place.

It is believed that a detailed description of the operation of the present species is unnecessary. Any decrease in the temperature to which thermo-couple 142 is subjected causes, as previously explained, a decrease in the energization of relay coil 31, which moves armature 33 to the right. As in the previous species this causes rotation of motor 15 in a direction to cause counter-clockwise movement of shaft 21 to open valve 10 still farther. At the same time, the arm 172 is moved to the right to increase the energization of relay coil 31 and decrease that of relay coil 32 and to accordingly rebalance the relay and limit operation of the motor. When, on the other hand, the temperature to which thermo-couple 142 is subjected increases, the voltage impressed across relay coil 31 is increased so as to unbalance the relay in the opposite direction moving armature 33 to the left. This causes rotation of motor 15 in the opposite direction causing counter-clockwise movement of shaft 21 and a movement of valve 10 towards closed position. At the same time, contact arm 172 is moved to the right to decrease the energization of relay coil 31 and increase that of relay coil 32, thus rebalancing the energization of relay 30 and terminating operation of the motor.

While in the last described species, the use of sliding contacts is not avoided, these contacts are only used where the variable resistances are employed for manual adjustment of the device or are operated by the motor, in which case the power available for operation of the contacts is relatively great. The variable resistance, however, which is used for controlling the system and which is responsive to a controlling condition contains no moving parts whatsoever and is unlimited in the number of resistance values which it can assume. Moreover, this particular variable resistance device is ideally adapted for extremely high temperatures wherein the use of the ordinary temperature responsive element, such as bimetal, is not possible.

While the systems have been shown as employed in connection with the controlling of a condition, it is to be understood that the invention is not so limited and that various features thereof are applicable to any system wherein an object is positioned by a main controller. In general, while certain specific embodiments of the invention have been shown, it is to be understood that they are for purposes of illustration only and that my invention is limited only by the scope of the appended claims.

I claim as my invention:

1. In a temperature control system, a temperature controlling member, a resistance element of a material which when placed in a magnetic field has its resistance varied in accordance with the intensity of the field to which it is subjected, means for producing a magnetic field in proximity to said element, means including a thermo-couple for varying the intensity of the field, and means responsive to the resistance value of said element for varying the position of the temperature controlling member.

2. In a condition controlling system, a condition controlling member, a resistance element of a material which when placed in a magnetic field has its resistance varied in accordance with the intensity of the field to which it is subjected, means for producing a magnetic field in proximity to said element, means including a non-adjustable condition responsive device for varying the effect of the field on said element, a second resistance member connected to said first named resistance element, means responsive to the relative values of said first named resistance element and said second resistance member for positioning the condition controlling member, means for varying the resistance value of said second resistance member to thereby vary the condition setting of the system, and a third variable resistor for varying the amount of movement of the controlling member resulting from a given change in the resistance value of said first named resistance element.

3. In a condition controlling system, a condition controlling member, a resistance element of a material which when placed in a magnetic field has its resistance varied in accordance with the intensity of the field to which it is subjected, electromagnetic means for producing a magnetic field in proximity to said element, a thermocouple connected to said electromagnetic means for variably energizing the same to thereby vary the resistance value of said resistance element, a second resistance member connected to said first named resistance element, means responsive to the relative values of said first named resistance element and said second resistance member for positioning the condition controlling member, means for varying the resistance value of said second resistance member to thereby vary the condition setting of the system, and a third variable resistor for varying the amount of movement of the controlling member resulting from a given change in the resistance value of said first named resistance element.

4. In a temperature controlling system, a temperature controlling member, a resistance element of a material which when placed in a magnetic field has its resistance varied in accordance with the intensity of the field to which it is subjected, means energized by a thermo-couple for producing a magnetic field in proximity to said element, a second resistance member connected to said first named resistance element, means responsive to the relative values of said first named resistance element and said second resistance member for positioning the temperature controlling member, and means for varying the resistance value of said second resistance member to thereby vary the temperature setting of the system.

NELSON O. CLARK.